United States Patent [19]

Jacobson

[11] Patent Number: 5,562,978

[45] Date of Patent: Oct. 8, 1996

[54] POLYMER-COATED INORGANIC PARTICLES

[75] Inventor: Howard W. Jacobson, Wilmington, Del.

[73] Assignee: E. I. Du Pont de Nemours and Company, Wilmington, Del.

[21] Appl. No.: 468,106

[22] Filed: Jun. 6, 1995

Related U.S. Application Data

[63] Continuation-in-part of Ser. No. 442,068, May 16, 1995, which is a continuation-in-part of Ser. No. 212,402, Mar. 14, 1994, Pat. No. 5,427,854.

[51] Int. Cl.$^6$ .................................................. B32B 5/16
[52] U.S. Cl. ........................ 428/323; 428/327; 428/328; 428/403; 523/201; 523/202; 523/205
[58] Field of Search ............................ 428/372, 403, 428/323, 327, 328; 523/201, 202, 205

[56] References Cited

U.S. PATENT DOCUMENTS

| | | | |
|---|---|---|---|
| 3,024,209 | 3/1962 | Ferrigno | 260/2.5 |
| 4,296,174 | 10/1981 | Hanzel et al. | 428/389 |
| 4,426,435 | 1/1984 | Oka | 430/132 |
| 4,514,322 | 4/1985 | Swoboda | 252/518 |
| 4,710,535 | 12/1987 | Perrot et al. | 524/413 |
| 4,713,306 | 12/1987 | Pinsky et al. | 428/432 |
| 4,787,125 | 11/1988 | Pinsky et al. | 29/2 |
| 5,108,684 | 4/1992 | Anton et al. | 264/176.1 |
| 5,202,211 | 4/1993 | Vercoulem et al. | 430/109 |
| 5,213,892 | 5/1993 | Bruckner | 428/372 |
| 5,284,705 | 2/1994 | Cahill | 428/328 |
| 5,308,687 | 5/1994 | Melpolder et al. | 428/411.1 |
| 5,316,846 | 5/1994 | Pinsky et al. | 428/325 |
| 5,340,676 | 9/1994 | Anderson et al. | 430/63 |

FOREIGN PATENT DOCUMENTS

| | | |
|---|---|---|
| 4317019A1 | 2/1993 | Germany . |
| WO94/22962 | 10/1994 | WIPO . |

*Primary Examiner*—Newton Edwards

[57] ABSTRACT

Synthetic organic fibers containing finely divided, inorganic particles that have certain organic polymeric coatings have improved dispersibility within a matrix material and significantly less abrasiveness than do identical fibers containing such particles without any such polymeric coatings.

3 Claims, No Drawings

POLYMER-COATED INORGANIC PARTICLES

REFERENCE TO RELATED APPLICATION

This is a continuation-in-part of U.S. patent application Ser. No. 08/442,068, filed on May 16, 1995, currently pending which is a continuation in part of application Ser. No. 08/212,402, filed Mar. 14, 1994, issued as U.S. Pat. No. 5,427,854, both in the names of Goodrich and Jacobson and entitled "Fibers Containing Polymer Coated Inorganic Particles"; the disclosures of which are hereby incorporated by reference.

FIELD OF THE INVENTION

The instant invention relates to inorganic particles having a surface coating of an organic polymer, and synthetic organic fibers that contain finely divided, abrasive, inorganic particles and a process for dispersing the particles in the fibers. More particularly, the invention concerns an improvement in such fibers, wherein the inorganic particles have a surface coating of an organic polymer, which is different from the polymer of the fibers. As a result of the improvement, abrasive wear of equipment used to handle the fibers is significantly decreased.

BACKGROUND OF THE INVENTION

Synthetic organic fibers typically contain finely divided inorganic particles. The particles typically are intended to serve as delustrants, pigments, fillers, stabilizers, etc. The particles can be incorporated into the fibers alone or in combination with other materials and additives. For example, Anton et al., U.S. Pat. No. 5,108,684, which concerns the production of stain-resistant nylon fibers, discloses the use of a multipolymer nylon resin, in combination with the inorganic particles and other additives, to form a "master-batch" for incorporation into a nylon polymer that is melt-spun into fiber. Perrot et al., U.S. Pat. No. 4,710,535, which also concerns production of master batches for nylon fibers, discloses the combination of (a) 10–50 weight % of finely divided titanium dioxide particles coated with silica and alumina and treated with a polysiloxane oil, with (b) 50–90% of a nylon-6/66 copolyamide binder.

Fibers containing inorganic particles can be very abrasive and cause excessive wear in surfaces of equipment that come into contact with the fibers. The rubbing of moving fibers, filaments, threads and yarns which contain inorganic particles can severely abrade and score the surfaces of guides, rolls, winders, knitting needles and like equipment. To decrease such abrasive wear, various methods have been suggested. For example, lubricants have been dispersed into the body of the fibers or applied to the surface of the fibers to reduce fiber abrasiveness. However, further improvements are desired.

The present inventors in their attempts to decrease fiber abrasiveness found that unexpectedly large reductions in the abrasiveness of fibers can be obtained if the inorganic particles have a thin surface coating of an organic polymer when they are incorporated into the fiber.

Polymer-coated inorganic particles, per se, are known. For example, Published German Patent Application 4,317,019, discloses for use in paints, inks, plastics and cosmetic preparations, inorganic pigments which are coated with various organic polymers, such as melamine resins, polyethylene, polypropylene, polyurethanes, polyesters and others. Also, Ferrigno, U.S. Pat. No. 3,024,209, discloses the use of inorganic pigments coated with a polymeric film as fillers for extending flexible and semi-rigid open-celled polyurethane plastics. Neither of these references disclose the use of such coated particles in fibers.

The disclosure of the aforementioned references is hereby incorporated by reference.

SUMMARY OF THE INVENTION

The present invention provides an improved synthetic organic fiber containing finely-divided inorganic particles. To reduce the abrasiveness of the fiber, the improvement of the present invention comprises the inorganic particles having a coating of an organic polymer, e.g., a hydrophilic or hydrophobic polymer. Typically, the coating is of a solid polymer that is not the same as the polymer of the synthetic organic fiber. The inorganic particles typically amount to in the range of about 0.1 to about 8%, usually 1 to 5%, of the total weight of the fiber. The weight of the coating is typically in the range of 0.3 to 8%, preferably 2 to 5% of the weight of the inorganic particles. When the fiber is an elastomeric polyurethane fiber, the polymer of the particle coating is preferably polyamide polymer. When the fiber is a nylon fiber, the polymer of the particle coating is preferably melamine resin or polyamide polymer.

The invention also includes certain novel polymer-coated inorganic particles and a process for preparing the fibers of the invention. In one aspect of the invention relates to a process for applying a polymeric coating without using solvents.

In general, the polymer-coated inorganic particles of the instant invention can be incorporated within a matrix material wherein the coated particles impart improved abrasivity, tackiness, toughness, higher particle loadings, dispersibility, among other desirable properties.

DETAILED DESCRIPTION

The following descriptions of preferred embodiments of the invention are included for purposes of illustration and are not intended to limit the scope of the invention, which is defined by the appended claims.

"Fibers", as used herein, means filaments, fibers, and/or yarns prepared from synthetic organic polymer. Elastomeric fibers are capable of recovering rapidly and substantially completely from a tensile elongation of at least 100%. Such elastomeric fibers include thermoplastic elastomers, spandex and the like. Spandex as used herein has its customary meaning, namely, a manufactured fiber in which the fiber-forming substance is a long chain synthetic elastomer composed of at least 85% weight of a segmented polyurethane.

For convenience, in the discussion and examples that are presented below, the following abbreviations may be used for the accompanying term:

| | |
|---|---|
| PO4G | Poly(tetramethyleneether)glycol |
| MDI | Methylene-bis(4-phenylisocyanate) |
| NCO | Isocyanate end group |
| EDA | Ethylenediamine |
| MPMD | 2-methyl-1,5-diaminopentane |
| DMAc | N,N-dimethylacetamide solvent |
| DEA | Diethylamine |
| Elvamide ® 8063 | A 46/34/20 terpolymer of polycaprolactam (nylon-6), poly(hexamethyleneadipamide) (nylon-6,6) and poly(hexamethylene sebacamide)(nylon-6,10) having a number |

|  |  |
|---|---|
|  | average molecular weight of 16,800 sold by E. I. du Pont de Nemours & Co. of Wilmington, De. |
| Melamine Resin | A polymer of melamine and formaldehyde. |
| Zylac® 100 | A copolymer of various alkene monomers, formed primarily of branched polyethylene, having a number average molecular weight 650, sold by Petrolite Corporation Polymers Division of Tulsa, OK. |
| Cyanox® 1790 | 1,3,5-tris(4-t-butyl-3-hydroxy-2,6-dimethylbenzyl)-1,3,5-triazine-2,4,6(1H,3H,5H)trione, antioxidant sold by Cytec. |
| Methacrol® 2462B | A polyurethane of N-t-butyldiethanolamine and 4,4'-methylene-bis(cyclohexylisocyanate), manufactured by E. I. du Pont de Nemours & Co. |

The chemical composition of a polymer of a spandex also may be abbreviated, for example, as follows. A poly- urethaneurea made from a poly(tetramethyleneether) glycol ["PO4G"] having a number average molecular weight of 1800, methylene-bis( 4-phenylisocyanate) ["MDI"] and a mixture of ethylene diamine ["EDA"] and 2-methyl-1,5-diaminopentane ["MPMD"] in a molar ratio of 90 to 10, is abbreviated as PO4G(1800):MDI:EDA/MPMD(90/10). Note that colons separate the monomers of the repeating units of the polymer, a slash (i.e./) between the diamines indicates that the diamines are in a mixture and the parenthetic numbers immediately following the glycol and diamine mixture respectively, refer to the number average molecular weight of the glycol and the molar ratio of the diamines in the mixture.

In accordance with the present invention, a wide range of synthetic organic fibers which contain inorganic particles have their abrasiveness importantly decreased by the presence of a polymeric coating on the particles. The invention is suitable for use fibers of polymers that can be melt-spun, dry-spun or wet-spun by conventional techniques. Preferred fibers include nylon fibers and spandex formed of a polyurethaneurea polymer. Also, in addition to reducing the abrasiveness of spandex containing inorganic particles with polymeric coatings in accordance with the invention, the coated particles also result in a significant decrease in the tackiness of the spandex.

Dispersed within the polymer of fibers of the invention are finely divided inorganic particles. The particles have an organic polymer coating on their surfaces. The organic polymer coating can completely or partially coat the surface of the particle. As used herein, the term "coated inorganic particles" is intended to include both totally coated and partially coated particles.

The polymer of the particle coating is not identical with the polymer of the fiber. If the coating polymer is initially the same as the fiber polymer, the coating polymer should be cross-linked or reacted with the surfaces of the inorganic particles before the coated particles are dispersed in the fiber polymer. The coating polymer is solid (i.e., not liquid) and has a number average molecular weight of at least 2,500, though polymers with molecular weights as low as about 600 are suitable for particle coatings according to the invention. In some cases, the polymer coating has a molecular weight of about 15,000 to least 25,000; usually 2,500 to 10,000. It is believed that the surface tension of the coating polymer plays a role in satisfactorily incorporating the coated particles into the polymer of the fiber and that coating polymers having surface tensions of at least about 35 dynes/cm are useful. When intended for particles that are to be incorporated into fibers which are to be wet or dry spun, the polymer of the coating should be of limited solubility in the solvent used in the fiber forming process. Also, the coating on the particles should adhere to the surface of the particles sufficiently strongly so that during typical de-agglomeration operations, such as hammer-milling or sand-grinding, the coating is not damaged. Typically, the polymeric coating amounts to in the range of 0.1 to 8%, usually 2 to 5%, of the weight of the inorganic particles.

The finely divided inorganic particles for use in the present invention typically are chosen from pigments, delustrants, stabilizers, fillers and the like. The more inherently abrasive the inorganic particles are, the more effective the invention is in reducing abrasiveness of the fiber containing the particles. The abrasive particles can be within a wide range of hardnesses and sizes. The Mohs Hardness of the particles typically is in a range of about 4 to about 9. For example, the most commonly used inorganic particles are of anatase or rutile titanium dioxide, which respectively have a hardness of 5.5 and 6.5. Fibers containing very hard pigments benefit especially from the present invention. For example, fibers containing cobalt aluminate, a blue pigment, which has a hardness of about 9 and which often imparts excessive abrasiveness to the fibers are rendered much less abrasive when the pigment is coated with organic polymer in accordance with the invention.

The inorganic particles can also comprise or consist essentially of at least one member from the group of mica, zinc oxide, clays, zeolites, barium sulphate, electroconductive powders, calcium carbonate, e.g., $CaCO_3$, color imparting pigments such as iron oxide, e.g., $Fe_2O_3$, and cobalt aluminate, e.g., $CoAl_2O_4$, $Ca_3(PO_4)_2$, mica, titania, mixtures thereof, among others. The electroconductive powder can comprise antimony-containing tin oxide, antimony-free electroconductive powders such as phosphorous, tantalum or fluoride doped tin oxide, particles having an electroconductive coating, e.g., titania or mica coated successively with silica and antimony-doped tin oxide, among others.

The size of the individual inorganic particles and more importantly, the size of agglomerates of the particles, also strongly affect the abrasiveness of the fibers that contain the particles. Best results are obtained with small particle sizes, and with very few and very small agglomerates within the fiber. Typically, the agglomerates of inorganic particles have a median size that is no greater than 20 microns, preferably no greater than 10 microns. Usually, the median size of the primary particles is in the range 0.1 to 2 microns.

Typically, the inorganic particles amount to in the range of 0.5 to 8% of the weight of the synthetic organic polymer from which the elastomeric fiber is formed. Preferably, the particles comprise 1 to 5% of the total weight of the fiber.

One or more of several methods can be used to apply organic polymeric coatings to inorganic particles to be incorporated into a matrix, e.g., fibers or structural polymers.

One convenient method comprises the steps of spraying a solution or dispersion of the coating polymer (e.g., a 10% solution of Elvamide® nylon multipolymer in alcohol or a 10% dispersion in water) onto the inorganic particles (e.g., titanium dioxide particles or $CoAl_2O_4$ particles) while the particles are being vigorously tumbled, drying the sprayed particles, then de-agglomerating or comminuting the coated particles. A fluid energy mill such as a steam micronizer operating at from 1 lb. steam/lb. inorganic particles to 3 lb. steam/lb. pigment is satisfactory for the deagglomeration/comminution step. If the inorganic particles are available as a wet filter cake instead of as dry particles, the spray-coating step can be replaced by a step in which the coating polymer solution or dispersion is mechanically thoroughly blended with the wet cake of inorganic particles.

If the polymer is available in a powder form, e.g., polymer powder 10 to 250 microns, the polymer powder can be physically blended with the inorganic powder and the mixture passed through the steam micronizer operated with super heated steam with from about 1 lb. steam/lb. inorganic particles to 6 lbs. steam/lb. inorganic particles to effect a polymer coated inorganic powder. Typically, the physical blend of powdered polymer and inorganic particles are exposed to a temperature of about 300° C. For example, a polyester oligomer powder, e.g., about 2 wt %, is physically blended with titania, e.g., rutile, by using a steam injector or steam micronizer which also impacts a substantially uniform polymeric coating upon the titania particles. This method is particularly desirable because it obviates using solvents for applying a coating upon the particles.

The polymer can comprise or consist essentially of any suitable organic material. Examples of suitable materials include Elvamide®, Melamine Formaldehyde, FuseBond®, polyethylene including polyethylene waxes, a polyester oligomer, Surlyn®, polyester, octyl silane, polymers or copolymers such as acrylamide, vinyl alcohol, polymers containing poly (ethoxylated chains), a branched olefin modified with maleic anhydride, polystyrene, mixtures thereof, among others. In some cases, the polymer can be a water soluble compound such as celluloses, celluse ethers including hydroxyethyl cellulose or carbonylmethyl cellulose, mixtures thereof, among others.

The polymer-coated particles of the invention can be employed in a virtually unlimited array of applications. Such applications include fibers, films, paper, inks, among other applications. For example, a mixture of inorganic particles comprising titania and an electroconductive powder can be added to a master batch for making films and fibers, e.g., Lycra® and nylon. Further, a mixture of inorganic particles having the same polymeric coating and/or mixture of the same inorganic particles having differing coatings can be employed for tailoring the properties of the surrounding matrix. In this regard, a plurality of polymeric coatings can be applied upon one or more types of inorganic particles.

The polymer-coated inorganic particles may also be incorporated, alone or with other additives, into any suitable matrix by conventional means. A suitable matrix can include fibers, films, inks, paper, among other matrices. For example, if the particles are to be incorporated into melt-spin fibers, a master-batch technique, among others, is suitable. For dry-spun or wet spun fibers, the coated particles can be included alone or along with other additives in a concentrated slurry which is then incorporated into the fiber polymer solution stream. In addition to the polymer-coated inorganic particles, other conventional agents optionally can be added to the fiber polymer at the same time. Such agents include antioxidants, thermal stabilizers, UV stabilizers, dyes, lubricating and anti-tack agents and the like. These techniques are illustrated in the Examples below.

TEST METHODS

The following test procedures were used for measuring various characteristics of the fibers described above and in the Examples below.

Two test methods were employed to measure the abrasiveness of synthetic organic fibers containing inorganic particles. The first test method is for elastic yarns. The second test method is for inelastic yarns.

The abrasiveness of a spandex elastic yarn is measured by forwarding a 40-denier (44-dtex) yarn over a 0.2-mm wide steel sinker blade from a circular knitting machine (supplied by Vanguard Supreme Division of Monarch Mfg. Co. of Monroe, N.C.). The sinker has a Shore Durometer T Hardness of 40. The abrasion test is performed under the following conditions. A sample spandex yarn is removed from a cylindrical yarn package with a roll-off take-off speed of 280 yards/min, is passed over the sinker blade and then to windup at 600 yd/min (548 m/min). The sinker blade contacts the yarn at the mid-point of it travel between the take-off and the windup so that the yarn is deflected from up a straight line path. The yarn makes an angle of 20 degrees between its path upstream and its path downstream of the sinker blade. The length of yarn that passes over the sinker in a given test is measured in meters. The amount of wear on the sinker is determined by image analysis of the irregular groove worn by the yarn on the sinker, using a suitable computer program. The computation involves drawing an imaginary straight line between the unworn surfaces on either side of the groove and integrating the area under the line by drawing hundreds of perpendicular lines from the straight line to the bottom of the groove. Wear, a measure of yarn abrasiveness, is reported in Table I of the Examples below in cubic microns per million meters of yarn, and is based on an average of four tests per sample.

The abrasiveness of an inelastic yarn is determined by measuring the depth of a cut made in a metal rod by passage of the yarn over the rod for a given period of time. In the Examples below, 700-den (770 dtex)/40 filament nylon-6,6 yarn is forwarded for one hour from 1 a feed roll over a brass pin of 0.6-cm diameter and 38 Rockwell B Hardness to a draw roll under the following conditions. Upstream of the pin, a conventional water-based finish is applied to the yarn, amounting to 1.1% of the yarn weight. The feed roll is operated at a temperature of 55° C. and at a surface speed of 170 yd/min (155 m/min). The draw roll speed is 430 yd/min (393/min). The yarn travels across a 160-degree arc on the surface of the brass pin. The depth of the cut made by the yarn is determined from the difference between the starting pin diameter and the "diameter" at the cut, both measured with a dial vernier caliper. The depth of the cut is proportional to the abrasiveness of the yarn and is reported in Table II of the Examples below in millimeters.

Over-end take-off tension, a measure of the tackiness of a spandex yarn, was determined in accordance with the procedures disclosed in Hanzel et al, U.S. Pat. No. 4,296,174, column 4, lines 20–45, with reference to FIG. 6 of the patent, which disclosure is hereby incorporated by reference. In accordance with this technique, measurement was made of the average tension required to remove a 183-meter sample of spandex yarn from the last third of a supply package of the yarn (i.e., the spandex that is within about 1.5 to 2 mm of the cylindrical core on which the spandex is wound) at a delivery rate of 45.7 meters per minute. During each test, about 4,000 individual tension measurements were averaged. Prior to each test, the spandex yarn sample was stored for 8 weeks after having been wound up on the cylindrical core of the package.

EXAMPLES

The Examples which follow illustrate the coating of inorganic particles by several techniques in accordance with the invention. The advantage in decreased yarn abrasiveness of yarns containing coated inorganic particles rather than non-coated particles is demonstrated with spandex elastic yarn in Example I and with nylon-6,6 inelastic yarn in Example II. Example I also demonstrates the advantage of decreased tackiness possessed by spandex yarns containing coated inorganic particles rather than non-coated particles. In the Examples, all samples of the invention are identified with Arabic numerals and Comparison Samples are identified with upper case letters. The results reported in the following examples are believed to be illustrative and representative of the invention, but do not constitute all the runs involving the indicated ingredients.

Example I

In this example, nine samples of inorganic particles coated with organic polymer are prepared and incorporated into spandex elastic yarn in accordance with the invention. Three substantially identical spandex yarns containing the same inorganic particles, but without the polymeric coating are prepared as Comparison samples. Testing of the abrasiveness and tackiness of the Sample and Comparison yarns, shows the clear advantage for the yarns made in accordance with the invention.

The polymer for the spandex was made from a capped glycol that was the reaction product of PO4G of 1800 number average molecular weight and MDI prepared with a capping ratio (i.e., the molar ratio of MDI to PO4G) of 1.63 and having a weight % NCO of 2.40 weight %. The capped glycol was chain extended with a 90/10 diamine mixture of EDA/MPMD. Diethylamine was employed as a chain terminator. The resultant PO4G(1800):MDI:EDA/MPMD(90/10) polymer was dissolved in DMAc to provide a solution having 36.8% solids. A concentrated slurry of additives in DMAc was made up and milled in a horizontal media mill. The slurry was then incorporated with the polymer solution to give concentrations (based on the weight of the polymer in the solution) of 1.5% Cyanox®1790, 0.5% Methacrol® 2462B, 0.6% silicone oil, and 2.0% $TiO_2$. When magnesium oxide particles were included, the MgO concentration was 1.5% and the concentration of $TiO_2$ (not coated) was decreased to 0.5%, and 4 ppm KP-32 anthraquinone dye was added. The polymer solution with the incorporated slurry additives was then dry spun into four-coalesced-filament, 44-dtex yarns in a conventional apparatus. Prior to testing, a conventional silicone surface lubricating finish was applied to the yarns. The finish added 4% to the weight of the yarn.

The coated particles were prepared as follows.

For Samples 1 and 2, titanium dioxide particles were coated with a polyamide from a solution of the polyamide in DMAc. A 5-liter, 4-neck, round-bottom flask in a heating mantle was employed. A thermometer was inserted in one neck, a stirring agitator in another neck, and a water-cooled reflux column in another neck. Three liters of DMac and 22.2 grams Elvamide® 8063 nylon multipolymer resin were added to the flask. The mixture was heated with agitation to 75° C., and then maintained at that temperature with stirring continued for about one hour until all the Elvamide® was dissolved. A glass funnel was placed in the fourth neck, and 1 Kg of Type R-902 rutile $TiO_2$ (Sample 1) or Type R-103 rutile $TiO_2$ (Sample 2) was added over a two to three hour period while stirring was continued. Both types of $TiO_2$ are available from E. I. du Pont de Nemours & Co., Wilmington, DE. After the addition was complete, the contents of the bag were stirred for another 30 minutes with the temperature maintained at 75° C. Then while stirring was continued, the contents of the flask were allowed to cool to room temperature. The resultant Elvamide®-coated $TiO_2$ particles were removed from the DMAc with a sintered glass filter and then dried for 12 hours at 90° C. in a vacuum drying oven.

For Samples 3–5, Type R-103 $TiO_2$ particles were coated with a polyamide from a solution of the polyamide in ethanol. A 2.724-Kg load of the $TiO_2$ was placed in a large plastic bag. A 10% solution of Elvamide® in ethanol (Gental® 101, sold by General Plastics Corp., Bloomfield, N.J.) was placed in a pistol-grip sprayer and sprayed directly onto the $TiO_2$ in small increments, with rigorous tumbling of the contents of the bag between increments. The amount of polyamide coated onto the $TiO_2$ was determined from the amount of polyamide delivered from the sprayer. After the desired amount of solution was added to the $TiO_2$, the bag was securely closed and vigorously tumbled. The product was then dried at 120° C. for 12 hours. Sample 3 had been sprayed with 150 grams of solution to yield $TiO_2$ particles having an Elvamide® coating amounting to 0.5% of the weight of the particle. Sample 4, which had been sprayed with 600 grams of solution, had an Elvamide® coating amounting to 2.2% of the particle weight, and Sample 5, which had been sprayed with 1.2 Kg of solution, had a coating amounting to 4.2% of the particle weight.

Sample 6 was prepared with the same equipment and by the same general procedure as was used for Samples 3–5, except that the Gental® 101 was replaced by 600 grams of Genton® 310 (a dispersion of 10% Elvamide® 8063 in water, from General Plastics Corp.). The resultant particles were coated with Elvamide® amounting to 2.2% of the particle weight.

For Sample 7, $TiO_2$ was coated with a melamine resin as follows. Eight liters of de-ionized water were placed in a 17-liter capacity glass vessel equipped with a motor-driven stirrer. Then while the water was being stirred, 120 g of Melamine Resin Grade BTLM-817 (available from BTL Specialty Resins Corp., Toledo, Ohio) were slowly added and the mixture was heated to, and maintained at 75° C. while being stirred for 30 minutes. Three Kg of Type R-103 $TiO_2$ were added over a 5-minute period. The mixture was stirred for another 10 minutes and then was allowed to cool to 25° C. The $TiO_2$ coated with melamine amounting to 4% by weight of the particles, was filtered from the water, dried at 120° C. for 4 hours, hammer milled, and micronized in a fluid energy mill with superheated steam at 270° C. and with a steam-to-particle weight ratio of 3:1.

For Sample 8, Type R-103 $TiO_2$ particles were coated with Zylac® 100 α-alkene polyethylene copolymer by substantially the same procedure as was used for Sample 2, with Zylac®-100 being substituted for Elvamide®-8063 nylon multipolymer resin. The Zylac®copolymer had a number average molecular weight of 650, the lowest of the coating polymers illustrated in this example,. After the filtration and drying steps of the procedure, the coated particles were hammer-milled to decrease the size of any agglomerates. The Zylac® coating on the particles amounted to 2.0% of the weight of the particles.

For Sample 9, magnesium oxide particles were coated with a polyamide by the general method used for Sample 1. One Kg of magnesium oxide (MagChem 50M, sold by Martin Marietta Magnesia Specialties, Baltimore, Md.) 22.2 grams Elvamide® 8063, and 3 liters DMAc were used to obtain dried MgO particles that were coated with Elvamide® amounting to 2.2% by weight of the particles. To decrease the size of any agglomerates the coated particles were passed through a hammer mill.

Three samples of particles having no coating were also included in this Example; namely, Comparison Sample A which comprised non-coated R-902 $TiO_2$, Comparison Sample B which comprised non-coated R-103 $TiO_2$ and Comparison Sample C which comprised non-coated MagChem 50M MgO.

Each of the above-described samples of coated or non-coated inorganic particles was mixed with a slurry of additives that was to be added to the polymer/DMAc solution for dry spinning spandex. Before combining the inorganic particles and the additive slurry with the polymer/DMAc solution, the particle and additive slurries were milled to thoroughly blend and disperse the additives. The slurries incorporating Samples 1, 3–8, and Comparison Sample A were each milled at a rate of 30–35 grams/min in a 1.5-liter horizontal mill (Model No. HM-1.5, made by Premier Mills Corp., Reading, Penn.) with Ottowa sand as the milling medium. The outlet temperature was maintained at 70° C. The slurries incorporating the coated particles of Samples 3–8 comprised, by weight, 1,000 parts DMAc, 450 parts spandex polymer and 1,050 parts of coated particles.

The slurries incorporating Sample 2 and Comparison B were milled at a rate of 45 to 50 grams per minute on a 0.25-liter horizontal mill (Model No. HML-0.25, also from Premier Mills) using zirconium beads as the media and operating with an outlet temperature of 70° C.

The slurries incorporating Sample 9 and Comparison C were milled on the HM-1.5 Mill from Premier Mills. Glass beads of 1- to 2-mm size were used as the milling medium and the mill was operated with a slurry flow of 22 g/min and a tip speed of 2,000 ft/min (609 meters/rain).

The milled slurries were then added to the polymer/DMAc solution and dry-spun into 4-coalesced-filament spandex yarns. The spandex yarns were then subjected to abrasiveness tests. Some of the yarns also were subjected to tackiness (over-end take-off tension) tests. Results of the tests, summarized in Table I below, clearly demonstrate that yarns containing coated inorganic particles in accordance with the invention were significantly less abrasive than the yarns with the particles that were not coated and that particles coated with Zylac® copolymer provided the spandex yarn with the least tackiness.

TABLE I

Spandex Yarn Abrasion Tests (Example I)

| Sample | Particles | Coating | wt % | Abrasion* | Tackiness+ |
|---|---|---|---|---|---|
| 1 | R-902 TiO$_2$ | Elvamide ® | 2.2 | 0.21 | 0.4 |
| A | R-902 TiO$_2$ | None | 0 | 0.62 | 0.5 |
| 2 | R-103 TiO$_2$ | Elvamide ® | 2.2 | 0.47 | 0.3 |
| B | R-103 TiO$_2$ | None | 0 | 0.73 | 0.4 |
| 3 | R-103 TiO$_2$ | Elvamide ® | 0.5 | 0.49 | nm |
| 4 | R-103 TiO$_2$ | Elvamide ® | 2.2 | 0.47 | 0.4 |
| 5 | R-103 TiO$_2$ | Elvamide ® | 4.2 | 0.46 | 0.4 |
| 6 | R-103 TiO$_2$ | Elvamide ® | 2.2 | 0.44 | 0.4 |
| 7 | R-103 TiO$_2$ | Melamine | 4.0 | 0.45 | nm |
| 8 | R-103 TiO$_2$ | Zylac ® | 2.0 | 0.43 | 0.2 |
| 9 | MgO | Elvamide ® | 2.2 | 0.65 | 0.4 |
| C | MgO | None | 0 | 0.77 | 0.5 |

Notes:
* = wear in cubic microns per $10^6$ meters of spandex yarn.
+ = average tension in centiNewtons.
"nm" indicates no measurement was made Example II This example further illustrates the invention with the preparation inelastic nylon yarns containing very hard inorganic particles of cobalt aluminate that were coated in accordance with the invention (Samples 10 and 11) and then compares the abrasiveness of the yarns of the invention with a substantially identical comparison yarn (Sample D), except that the cobalt aluminate particles were not coated. For each sample and comparison the particles were incorporated into the nylon fibers by conventional master batch techniques.

The coated samples of cobalt aluminate particles (Samples 10 and were prepared as follow.

For Sample 10, 22.2 grams of Elvamide® 8063 were added to 3 liters of DMAc solvent in a 5-liter, 4-neck, round-bottom flask equipped with thermometer, condenser, and mechanical stirrer. The contents of the flask were heated to 75° C. with stirring. One Kg of cobalt aluminate powder was added to the contents of the flask. Stirring was continued for an additional 30 minutes with the temperature at 75–80° C., then cooled to room temperature while stirring. The resultant coated powder was filtered from the DMAc with a sintered glass filter, vacuum dried at 120° C. and micropulverized.

For Sample 11, 40 grams of melamine powder (Melamine Resin Grade BTLM-817, available from BTL Specialty Resins Corp., Toledo, Ohio) were added to 2.5 liters of de-ionized water in a 4-liter beaker and heated with stirring to a temperature of 75° C. to dissolve the melamine in the water. One kg of CoAl$_2$O$_4$ particles was added to the aqueous melamine solution. The mixture was stirred for 10 minutes while being heated at a temperature in the range of 75°–80° C. Then the mixture was allowed to cool gradually to room temperature. The resultant coated CoAl$_2$O$_4$ particles were filtered with a sintered glass filter, dried at 120° C. for 4 hours, and micropulverized.

The above-described coated particles were incorporated into nylon- 6,6 fibers by mixing, with a conventional two-roll mill, in a 1:1 weight ratio (a) the coated inorganic particles of Samples 10 or 11, or the not-coated inorganic particles of comparison Sample D, with (b) Elvamide® 8063 multipolymer nylon (sold by E. I. du Pont de Nemours & Co., Wilmington, Del.). The resultant mixtures were coextruded with polycaprolactam to prepare a concentrate in which the inorganic particles amounted to 25% of the total concentrate weight. Then, by conventional methods, the concentrate was blended with a molten stream of poly(hexamethylene adipamide) and spun into fibers. The inorganic particles amounted to 0.4% by weight of the melt-spun fibers. Abrasiveness of the yarns was determined by the second of the above-described abrasiveness test methods, in which the depth of a cut made by the yarn passing over a brass rod is measured.

The following table summarizes the test results.

TABLE 2

(Example II, CoAl$_2$O$_4$ Particles)

| Sample | Coating Type | Wt. % | Cut Depth millimeters |
|---|---|---|---|
| 10 | Elvamide ® | 2.2 | 0.267 |
| 11 | Melamine resin | 4.0 | 0.267 |
| D | None | 0 | 0.470 |

The advantage of the coated particles is clearly shown by the table. The nylon yarn containing the coated particles abraded a cut in the brass rod that was only 55% as deep as the cut abraded by nylon yarns that contained particles that were not coated.

Example III

In this Example, steam micronization was employed for applying a polymeric coating comprising a branched olefin modified with maleic anhydride upon titania.

Approximately 3 hilograms of R-101, a rutile pigment commercially available from DuPont, was blended with about 65 grams of Zylac® 101, in a V-blender. The mixture was then passed through an 8 inch steam micronizer at a rate of 3 lbs. steam/lb. of mixed polymer/R-101 to effect a 2% Zylac® coated R-101 product. The Zylac® coated R-101 was a fully dispersed, free flowing white powder.

The following is claimed:

1. An inorganic particle having a coating of polymer wherein the polymer comprises at least one member selected from the group consisting of nylon 6, polyester, a polyester oligomer, polyethylene, acrylamide, melamine formaldehyde, vinyl alcohol, polymer containing poly (ethoxylate chains), polystyrene, a branched olefin modified with maleic anhydride, cellulose, cellulose ether and mixtures thereof, and wherein said coating is from about 0.1 to about 8% by weight of the inorganic particle.

2. The coated inorganic particle of claim 1 or wherein the particle comprises electrically conductive tin oxide.

3. The coated inorganic particles of claim 1 wherein the particle comprises at least one member selected from the group consisting of titania, a zeolite, $BaSO_4$, clay, mica, iron oxide, cobalt aluminate, electrically conductive tin oxide, calcium carbonate, mica, calcium phosphate and mixtures thereof.

* * * * *